U. ROUVIERE.
ELECTRIC TRACTION SYSTEM.
APPLICATION FILED JUNE 19, 1916.
1,358,580.
Patented Nov. 9, 1920.
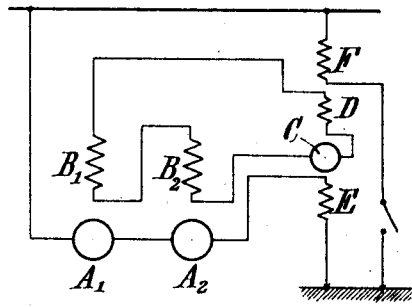
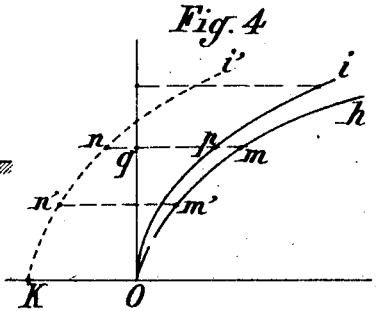
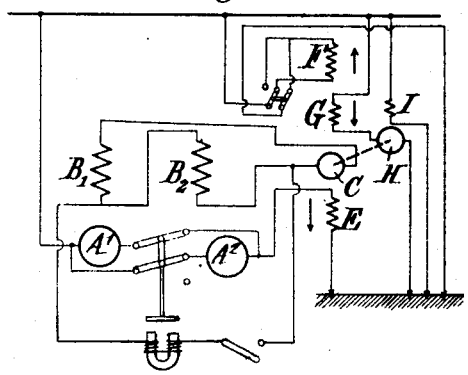
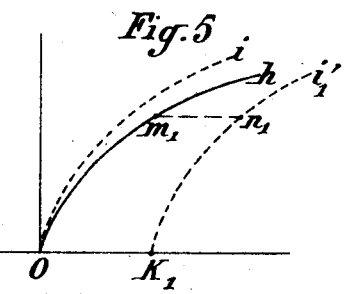
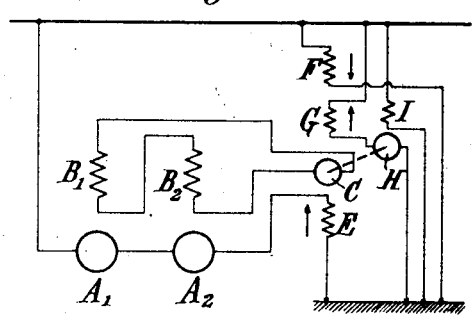
Witnesses
Inventor
Ulysse Rouviere
By Sturtevant & Mason
Attorneys

UNITED STATES PATENT OFFICE.

ULYSSE ROUVIERE, OF PARIS, FRANCE, ASSIGNOR TO LA SOCIÉTÉ ANONYME DITE ATELIERS DE CONSTRUCTIONS ELECTRIQUES DU NORD ET DE L'EST, OF PARIS, FRANCE.

ELECTRIC TRACTION SYSTEM.

1,358,580.     Specification of Letters Patent.     Patented Nov. 9, 1920.

Application filed June 19, 1916. Serial No. 104,473.

*To all whom it may concern:*

Be it known that I, ULYSSE ROUVIERE, a citizen of the Republic of France, residing at Paris, in the Republic of France, have invented certain new and useful Improvements in Electric Traction Systems, of which the following is a specification.

The present invention relates to certain improvements in electric traction systems, more particularly to a system in which ordinary direct current traction apparatus is combined with certain special accessory apparatus allowing for an automatic control of power after starting, and also allowing of electric regenerative braking.

It is known that with series motors the power diminishes according as the speed increases. It is therefore when the starting by means of resistances has reached its limit and the speed is still small that the power absorbed by the apparatus reaches its maximum. Now, it is often desirable to maintain up to highest speeds the maximum power for which the motors are designed. One would by this means obtain a more rapid acceleration and one could, other things being equal, obtain an appreciable gain in time.

With this object in view one could shunt the motor field in steps, but this process would involve complications in operation and would cause surges of current.

The present invention therefore has firstly for its object a means of maintaining the full power by means of a continuous automatic control of the excitation according as the speed increases.

Secondly, the present invention allows for electric regenerative braking under the same conditions of automatic control and the means of carrying out these operations permit at each instant a switching from the running position of the motors to the braking position and allows the braking power to be kept substantially constant by continually strengthening the excitation according as the speed decreases.

In order to carry out this double object an ordinary apparatus is provided with a special exciting machine which feeds the field winding of the main traction motor or motors during the period of running and during the period of braking.

The special exciting machine is provided with a means of excitation such that the current supplied at each instant by this exciting machine to the field windings of the main motor or motors is subject to a variation corresponding to the variation in speed, while the armature current of the main motors remains substantially constant.

The invention is more particularly described with reference to the accompanying diagrammatic drawings in which:—

Figure 1 illustrates diagrammatically one arrangement of the present invention.

Fig. 2 illustrates a modification under running conditions.

Fig. 3 illustrates the same arrangement under braking conditions.

Figs. 4 and 5 are curved diagrams.

An exciting machine having the characteristics above mentioned is shown in Fig. 1 in which $A^1$ and $A^2$ are the armatures of the two motors of an electric traction apparatus; $B^1$ and $B^2$ are their windings connected with the armature C of the exciter which is provided with a triple excitation consisting firstly of an excitation winding D in series with its armature; an excitation E carrying the main traction current; and thirdly, a constant excitation F connected for instance to the limits of the traction system.

If it be taken that the exciting machine supposed to be of constant speed, works on the straight line part of its characteristic and that the series winding D is sufficient to produce the necessary excitation, it follows that the two windings E and F will give ampere turns equal and opposite and this will remain true for all conditions of excitation below the saturation conditions.

If it be considered that the excitation provided by the exciter of the main motors is such that the back electro-motive-force developed on these last motors is equal to the electro-motive-force of the system, no current will pass in the main circuit as long as the exciting winding F is out of circuit, but directly the circuit of this exciting winding F is closed the excitation electro-motive-force will tend to fall and the back electro-motive-force of the main motors being by this means diminished, a current will be set up in the main circuit and pass to the exciting winding E. If the ampere-turns of winding E determined by this current are of an opposite direction to the ampere-turns of F, the main current will attain such a value that the ampere-turns of F are lessened by the back ampere turns of E, and this will remain true for all the excitation conditions of the main motors; in other words for all speeds. The ampere-turns of winding E will always be less than the ampere-turns of winding F by an amount sufficient to reduce the excitation of windings $B^1$, $B^2$ to a point where the counter-electromotive force of the motors while running as a motor is less than the line voltage by an amount equal to the ohmic drop in the motor circuit.

By this means, therefore, an automatic control system is provided giving constant power and a variable speed.

In order that this should be fully so, the series winding D must suffice exactly for excitation of the exciting machine and in order to obtain this, this latter machine must not reach the limits of saturation, and further its speed must be constant.

In practice the exciting machine will be driven by a motor which is subject to a certain fall in speed. Further, one must take into consideration the effects of saturation, of the ohmic fall, of armature re-action, and the like. Further, it is necessary to maintain the winding D substantially below the corresponding limit of self-excitation as if not, it would be subject to dangerous inversions of polarity.

All these conditions necessitate that in practice with the exciter shown in Fig. 1 the main current cannot always be maintained as constant, as might be desirable.

One would obtain better results by adopting preferably the special exciting machine shown in Fig. 2 of the drawing.

The exciting machine is driven by a small motor placed across the traction mains, which motor takes current always in the same direction, the current varying substantially as the square of the current given out by the exciting machine. For the series winding D of the exciting arrangement previously mentioned there is substituted a winding G carrying current to the motor which drives the exciting machine. This motor, which may have a shunt field, or be a series or a compound wound motor, is represented by its armature H and a shunt winding I. The exciting machine C is further provided with windings E and F.

The co-action of the windings G and E during the braking is similar to their co-action during motoring conditions. The relationship is such that under motoring conditions the two windings act in the same direction and consequently act in opposite directions when braking. The fine wire constant value winding F, must always carry current in an opposite direction to that of the winding E carrying the main current. It must therefore, be reversed when one wishes to pass from running conditions to braking conditions.

The arrows indicated on Fig. 2 show the directions of the magnetic fields created by the field windings during running conditions. In Fig. 3 the direction of the fields is indicated for braking conditions.

The operation will be better understood by means of Fig. 4, which shows the excitation machine characteristics.

The ordinates of the curve $h$ measure excitation volts and at the same time on a different scale, the amperes of the excitation of the main motors. The abscissæ are the excitation fields of the exciter in values of ampere turns.

As the ampere turns of the winding G are proportional to the power of the exciting machine, that is to say, to the square of the current given out by its armature, these ampere turns are measured as a function of the volts by the abscissæ of a curve $i$ proportional to the square of its ordinates. The number of winding turns of G are selected such that this curve approaches the characteristic $h$, remaining however slightly away from it in order to avoid self-excitation by the winding G alone.

At a certain speed the excitation current of the main motor is measured by the ordinates of a point $m$ on the curve $h$. It is possible to obtain in this manner the current in the armature winding corresponding to it. From a point K taken such that the length OK measures the ampere turns of the constant excitation F, the curve $Ki'$ runs parallel to $Oi$. The ampere turns of the winding E are evidently measured by the distance $m\ n$ between the characteristic $Oh$ and the line $Ki'$. As a matter of fact $$qm = mn + qp - pn.$$

Where $qm$ is the total excitation value of the exciting machine, $mn$, $qp$, $pn$, are respectively the three partial excitation values of the inducing windings E, G and F.

For another speed one has another definite excitation by a point M', to which corresponds a main armature current measured by $m'\ n'$. It will be therefore clearly seen that the main current remains substantially constant in spite of the large variations in excitation current, or otherwise expressed, of the speed. The condition is stable as all the instantaneous variations of armature current produce a variation in the same direction of the inducing current, which therefore reëstablishes equilibrium.

For braking conditions it is sufficient to reverse the direction of current in the fine wire winding F without modifying the other circuits (see Fig. 3). By this means one obtains a reversal of armature current, that is to say, one obtains braking conditions without modifying or upsetting in any manner excitation conditions.

Similarly as when running, the braking current remains substantially constant over very large variations in excitation conditions, or in other words, the braking value remains substantially constant between large limits of variations of speed. This braking current is measured as may be seen from Fig. 5 of the drawing, by abscissæ $m'$ $n'$ between the characteristic and a curve $K'i_1$ traced parallel to $Oi$ from a point $K_1$ such that $OK_1$ measures the ampere turns of the winding F. Similarly as for running conditions, the braking control is absolutely stable as all tendency to increase the braking current is accompanied by a decrease in the excitation voltage, which therefore tends to stabilize.

The passing from full running conditions to full braking conditions can, without inconvenience, be made by a rapid reversal of the winding F, but it is also possible to have transition steps with a constant excitation F reduced in value, that is to say, one can have several conditions at constant power by controlling the excitation F.

If it is desired to obtain in a more complete manner automatic regulation at constant power, the exciter of Fig. 2 can be provided with a fourth excitation fed by the excitation current of the main motors. Finally, it is evident that an exciter which has only the windings E and F, will still allow of the operation of a system decreasing in power with the speed; a result which will be inferior to that obtained with the arrangements above mentioned.

The system is reconcilable without difficulty to couplings in series and in parallel usually employed in the ordinary arrangements of two or four motors. Particularly when braking after having established braking conditions when coupled in parallel, one can continue braking when coupled in series and consequently regenerate almost the whole live force of the train.

It is possible therefore, to automatically obtain this changing of coupling by means of electro-magnetic contacts which will be operated at a desired moment by the excitation current of the motors.

The operation of the special arrangements described combined with any electric traction apparatus can be easily carried out. Either a special supplementary operating controller may be used, or a single operating controller can be used having the ordinary connections and those necessary for the combination with the exciter.

In the case of breakdowns or for some other reason it is possible by a simple operation of the commutator to place out of circuit the accessory arrangements and to establish the connections of the ordinary apparatus.

The hand lever controlling the electric regenerative braking will be preferably combined with the air brake lever so that all the braking operations are controlled by a single hand lever.

I declare that what I claim is:—

1. An electric system comprising electric mains, a main motor, connections between said main motor and said mains, an exciting winding on said main motor, an exciting machine, a driving motor for said machine, connections between said exciting winding and said machine, connections between said driving motor and said mains, field windings on said exciting machine, means to connect said field windings with the armature of said driving motor, a second winding on said exciting machine, and means to pass current passing through said main motor through said second winding.

2. An electric system comprising electric mains, a main motor, connections between said main motor and said mains, an exciting winding on said main motor, an exciting machine, a driving motor for said machine, connections between said exciting winding and said machine, connections between said driving motor and said mains, field windings on said exciting machine, means to connect said field windings with the armature of said driving motor, a winding on said exciting machine carrying current of constant value, and means to reverse the current in said winding of constant value to establish regenerative braking conditions on said main motor.

3. An electric system comprising electric mains, a main motor, connections between said main motor and said mains, an exciting winding on said main motor, an exciting machine, a driving motor for said machine, connections between said exciting winding and said machine, connections between said driving motor and said mains, a winding on said exciting machine, means to connect said winding in series with the armature of said main motor, a second winding on said exciting machine in series with the driving motor of the exciting machine, a third winding on said exciting machine carrying current of constant value, and means to reverse the current in said winding of constant value to establish regenerative braking conditions on said main motor.

4. An electric system comprising electric mains, a main motor, connections between said main motor and said mains, an exciting winding on said main motor, an exciting machine, a driving motor for said machine, connections between said exciting windings and said machine, connections between said driving motor and said mains, field windings on said exciting machine, means to connect said field windings with the armature of said driving motor, a winding on said exciting machine carrying current of constant value, and a second exciting winding on said exciting machine connected to the armature of the main motor.

5. An electric system comprising electric mains, a main motor, connections between said main motor and said mains, an exciting winding on said main motor, an exciting machine, a driving motor for said machine, connections between said exciting windings and said machine, connections between said driving motor and said mains, a winding on said exciting machine, means to connect said winding in series with the armature of said main motor, a second winding on said exciting machine carrying current of constant value, and a further exciting winding on said exciting machine connected to the armature of its driving machine.

6. An electric system comprising electric mains, a main motor, connections between said main motor and said mains, an exciting winding on said main motor, an exciting machine, a driving motor for said machine adapted to take current varying substantially as the square of the current furnished by said exciting machine, connections between said exciting winding and said machine, connections between said driving motor and said mains, a winding on said exciting machine, and means to connect said winding with the current passing through said main motor.

7. An electric system comprising electric mains, a main motor, connections between said main motor and said mains, an exciting winding on said main motor, an exciting machine, a driving motor for said machine adapted to take current varying substantially as the square of the current furnished by said exciting machine, connections between said exciting winding and said machine, connections between said driving motor and said mains, field windings on said exciting machine, means to connect said field windings with the armature of said driving motor, and a winding on said exciting machine carrying current of constant value.

8. An electric system comprising electric mains, a main motor, connections between said main motor and said mains, an exciting winding on said main motor, an exciting machine, a driving motor for said machine adapted to take current varying substantially as the square of the current furnished by said exciting machine, connections between said exciting winding and said machine, connections between said driving motor and said mains, field windings on said exciting machine, means to connect said field windings with the armature of said driving motor, a winding on said exciting machine carrying current of constant value, and means to reverse the current in said winding of constant value to establish regenerative braking conditions on said main motor.

9. An electric traction system comprising electric mains, a traction motor, connections between said traction motor and said mains, an exciting winding on said traction motor, an exciting machine, a driving motor for said machine, connections between said exciting winding and said machine, connections between said driving motor and said mains, a winding on said exciting machine carrying current of constant value, and means to reverse said current to establish regenerative braking conditions on said electric traction system.

10. An electric traction system comprising electric mains, a traction motor, connections between said traction motor and said mains, an exciting winding on said traction motor, an exciting machine, a driving motor for said machine, connections between said exciting winding and said machine, connections between said driving motor and said mains, a winding on said exciting machine carrying current of constant value, means to reverse said current to establish regenerative braking conditions on said electric traction system, and a second winding on said exciting machine fed by the same current feeding said traction motor.

11. An electric traction system comprising electric mains, a pair of traction motors, connections between said motors and said mains, an exciting winding on each motor, an exciting machine common to said motors, a driving motor for said machine, connections between said exciting windings and said machine, connections between said driving motor and said mains, a field winding on said exciting machine carrying constant current, means to reverse the current in said winding to establish regenerative braking conditions on said traction motors, parallel couplings beween the individual traction motors forming said pair, series couplings between the individual traction motors forming said pair, control means operating said connections between said individual motors, and electro-magnets operated by the excitation current of said traction motors operating said controlling means.

12. An electric traction system comprising electric mains, a pair of traction motors, connections between said motors and said mains, an exciting winding on each motor, an exciting machine common to said motors, a driving motor for said machine, connections between said exciting windings and said machine, connections between said driving motor and said mains, a field winding on said exciting machine carrying constant current, means to reverse the current in said winding to establish regenerative braking conditions on said traction motors, a second exciting winding on said exciting machine in series with said driving motor, parallel couplings between the individual traction motors forming said pair, series couplings between the individual traction motors forming said pair, control means operating said connections between said individual motors, and electro-magnets operated by the excitation current of said traction motors operating said controlling means.

13. An electric traction system comprising electric mains, a pair of traction motors, connections between said motors and said mains, an exciting winding on each motor, an exciting machine common to said motors, a driving motor for said machine, connections between said exciting windings and said machine, connections between said driving motor and said mains, a field winding on said exciting machine carrying constant current, means to reverse the current in said winding to establish regenerative braking conditions on said traction motors, a second exciting winding on said exciting machine in series with said driving motor, a third exciting winding on said exciting machine carrying the main traction current, parallel couplings between the individual traction motors forming said pair, series couplings between the individual traction motors forming said pair, control means operating said connections between said individual motors, and electro-magnets operated by the excitation current of said traction motors operating said controlling means.

14. An electric traction system comprising electric mains, a pair of traction motors, connections between said motors and said mains, an exciting winding on each motor, an exciting machine common to said motors, a driving motor for said machine, connections between said exciting windings and said machine, connections between said driving motor and said mains, a field winding on said exciting machine carrying constant current, means to reverse the current in said winding to establish regenerative braking conditions on said traction motors, a second exciting winding on said exciting machine in series with said driving motor, a third exciting winding on said exciting machine carrying the main traction current, an exciting winding on said driving motor connected to said mains, parallel couplings between the individual traction motors forming said pair, series couplings between the individual traction motors forming said pair, control means operating said connections between said individual motors, and electro-magnets operated by the excitation current of said traction motors operating said controlling means.

In witness whereof I have hereunto signed my name, in the presence of two subscribing witnesses.

ULYSSE ROUVIERE.

Witnesses:
 CHAS P. PRESSLY,
 ALPHONSE MÉJEAN.